United States Patent [19]

Plumat

[11] 3,785,792

[45] Jan. 15, 1974

[54] SURFACE COATING OF CHEMICALLY TEMPERED VITREOUS BODIES

[75] Inventor: Emile Plumat, Gilly, Belgium

[73] Assignee: Glaverbel S.A., Watermadel-Boitsfort, Belgium

[22] Filed: Sept. 9, 1969

[21] Appl. No.: 856,273

[30] Foreign Application Priority Data
Sept. 12, 1968  Luxembourg.......................... 56869
June 25, 1969  Great Britain.................... 32148/69

[52] U.S. Cl................................ 65/30, 65/33, 65/60
[51] Int. Cl........................ C03c 17/00, C03c 21/00
[58] Field of Search .................... 65/30, 32, 60, 33, 65/31; 117/24 B, 24 C

[56] References Cited
UNITED STATES PATENTS

| | | |
|---|---|---|
| 2,698,812 | 1/1955 | Schladitz............................ 65/60 X |
| 3,498,773 | 3/1970 | Grubb et al.......................... 65/60 X |
| 3,498,819 | 3/1970 | Lyle et al............................. 65/60 X |
| 3,287,201 | 11/1966 | Chisolm et al....................... 65/30 X |
| 3,411,934 | 11/1968 | Englehart et al. .................. 117/33.3 |
| 3,395,999 | 8/1968 | Lewek ..................................... 65/30 |

Primary Examiner—Arthur D. Kellogg
Attorney—Spencer and Kaye

[57]   ABSTRACT

A method for improving the adherence and uniformity of a coating layer on a body of vitreous or vitrocrystalline material by chemically tempering the body so as to impart compressive surface stresses to the surface to be coated before the coating layer is applied, and articles produced in such a manner.

28 Claims, 6 Drawing Figures

SURFACE COATING OF CHEMICALLY TEMPERED VITREOUS BODIES

BACKGROUND OF THE INVENTION

The present invention relates to a process for treating a body of glass or vitrocrystalline material, particularly a process in which one or more coating layers are applied to the body, and to bodies treated by such process.

Surface coatings are sometimes applied to bodies of such materials in order to modify the body with respect to its optical, mechanical, electrical, chemical, or physical properties. For example, it is known to deposit thin layers on articles made of glass to modify their optical properties.

Coating layers can be deposited on a body by various methods, such as evaporation in vacuo, cathode sputtering, or thermal decomposition of a compound on the body. As a specific example, vapors, such as halides, can be applied onto the surface to be coated while the surface is at an elevated temperature, so that the vapors decompose and react with the atmospheric oxygen to form oxide coatings.

However, layers deposited by these conventional processes may in some cases be fairly easily removed by contact or friction. Often the adherence of the coatings is uneven, and they are more susceptible to damage at certain regions of the coated body. Moreover, the optical properties of a layer, or a system of layers forming, for instance, an interference filter are often insufficiently uniform. A similar nonuniformity exists in the electric resistance of electrically conductive coatings deposited by the conventional processes: the value of the resistance per unit area is not identical at all points of the surface. It has also been found that water from the atmosphere can sometimes attack the material of the substrate even beneath a protective layer so that iridescence occurs more quickly at some points than at others.

SUMMARY OF THE INVENTION

It is a primary object of the invention to substantially reduce these drawbacks and difficulties.

A more specific object of the invention is to improve the adherence of surface layers to such materials.

Another specific object of the invention is to improve the uniformity of such surface coating layers.

A further object of the invention is to improve the general quality of such coating layers.

These and other objects according to the invention are achieved by a novel method for treating a body of glass or vitrocrystalline material, which method includes the steps of chemically tempering at least a portion of the body so as to create compressive stresses in the surface of such portion, and applying a coating layer to at least part of such surface.

The term "create compressive stresses" includes both producing such stresses where none existed before and increasing compressive stresses where such pre-exist.

The objects according to the invention are also achieved by a body treated according to such process, or an article composed of a body of material having at least one vitreous phase and possessing, in at least one portion, at least one type of ions whose concentration is higher in the surface region than in the subsurface region thereof so that the surface region is in a state of compressive stress, and a surface coating layer disposed on, and adhering to, at least part of the surface of such portion.

DESCRIPTION OF THE PREFERRED EMBODIMENTS

According to the present invention, a body of glass or vitrocrystalline material is treated by a process in which at least one substance is caused to enter into at least a portion of the body from at least one contacting medium, and the temperature during and after such entry is controlled to cause compressive surface stresses to be set up or increased in that portion of the body, and at least one coating layer is applied to the body on at least one portion thereof to which such compressive surface stresses have been imparted.

It was found that the adherence of a coating layer to a body of glass or vitrocrystalline material is substantially improved if the surface which is to receive the layer is in a state of enhanced compression or has been put into a state of compressive stress - i.e., tempered - by causing a substance to enter the article through such surface while appropriately controlling the temperature during and after such entry. Such a process of setting up or increasing surface compressive stresses is known as a chemical tempering process. The cause of the improved adherence is not yet well understood, but it is possible that the placing of the surface into a state of compressive stress or of increased compressive stress by the chemical tempering operation may reduce irregularities in the surface and that it is this which makes for thee better adherence.

In the case of a body made of vitrocrystalline material, in which all phases do not allow for a diffusion to the same extent, the invention will give the best results when that phase which is susceptible to the greater or greatest amount of diffusion of a substance from the contacting medium is well dispersed throughout the surface of the body. In such a case, the state of compression resulting from the diffusion process will still be more or less uniform.

Figure 3:
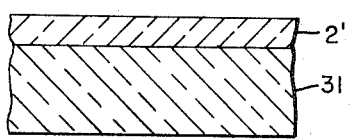
FIG. 3 is a detail, cross-sectional view of an article produced according to the invention.

The body which is treated according to the invention may constitute a manufactured article or part of such an article. For example, as shown in FIG. 3, the treated body of glass or vitrocrystalline material may itself be a coating 2' on a substrate 3' composed of a material different from that of the coating. The body may be solid during the whole treatment. However, as will hereafter be exemplified, it is possible for the introduction of the substance into the body, as part of the tempering step, to take place while the body is molten.

Thus, such introduction may occur, in the case of flat glass, during the manufacture of the glass.

When a substance enters a body of glass or vitrocrystalline material from a contacting medium, the substance may possibly, in certain cases, enter the body in the form of atoms or molecules, although in most cases the substance enters the body in the form of ions.

Usually, chemical tempering involves the replacement of ions in the body by ions deriving from the contacting treatment medium. It is possible, for example, to set up compressive stresses by replacing ions in exterior layers of the body with ions which confer a lower coefficient of thermal expansion on such exterior layers, while maintaining a sufficiently high temperature for a sufficient length of time for stress relaxation to occur, and subsequently allowing the body to cool.

Alternatively, surface compressive stresses can be set up by replacing ions in exterior layers of the body with larger ions while the surface layers of the body are at an elevated temperature which, however, is not high enough to allow substantial, or at least complete, stress relaxation to occur in the length of time during which such temperature is maintained, the body being then cooled to normal temperature so that the induced stresses are "frozen" in.

Furthermore, it is possible to introduce surface compressive stresses by causing ions to enter, under the influence of an electrical field, into the body through a surface thereof from a contacting medium without an accompanying equal movement of ions from the body into the contacting medium through that surface.

In preferred embodiments of the process according to the invention the chemical tempering step involves an ion exchange between constituent ions of a surface layer of the body and ions coming from at least one medium with which the body is in contact. Adherence of the subsequently applied coating is then reliably improved uniformly over the whole treated surface.

According to one advantageous embodiment of the process, the chemical tempering step entails an exchange between ions of the body and ions conferring on the surface of the body a lower coefficient of expansion, this exchange being effected at a temperature at which a stress relaxation in the body can occur. An example of the exchange occurring in this kind of chemical tempering treatment is the substitution of lithium ions for sodium ions in a glass body at a temperature higher than that of the "strain point" of the glass. When the glass cools, the surface is put in a state of compressive stress because the surface layers tend to contract less than the subjacent interior layers. A diffusion of this kind has the advantage of being very rapid and therefore economical.

In another advantageous embodiment of the process, the diffusion consists of an exchange between ions of the body and larger ions at a temperature, and for a period of time, such that a complete relaxation of the induced stresses can not occur. An example of this kind of chemical tempering treatment is an exchange between sodium ions initially in the glass body and potassium ions at a temperature below the annealing point and the glass. Very considerable compressive stresses can be set up by this kind of ion exchange.

Not only is the adherence of the subsequently applied coating layer or layers improved by the chemical tempering, but other properties are improved also. For instance, it has been found that a layer of gold deposited on a chemically tempered body becomes electrically conductive upon attaining a smaller thickness than if the gold were deposited without first chemically tempering the surface to be coated. The resistance per unit area of the conductive layer is also made more uniform by the chemical tempering treatment.

It can be demonstrated, for example, by ellipsometry, that the refractive index of dielectric layers deposited on a chemically tempered surface is also more uniform than that of similar layers deposited on an untempered surface.

Another advantage of the invention resides in the fact that coating layers can be deposited by different processes with less risk of the body breaking due to thermomechanical effects. The advantage of this is manifest particularly in the coating of glass. For instance, it is possible to apply coatings by evaporation in vacuo or cathodic sputtering, or by a method in which the body is dipped into a solution of an organometallic compound and is then given a heat treatment which forms a metal oxide coating in situ.

The chemical tempering treatment may leave traces of unwanted substances on the surface to be coated, e.g., traces of reaction products created by a reaction between the body and the treatment medium used in the chemical tempering step. Advantageously, before applying each coating layer, at least a portion of any such reaction product or other residual substance is removed.

Particularly advantageously, at least a portion of any residual substances is removed by means of an acid solution. A solution of this kind rapidly and effectively removes any reaction products from the surface. This acid treatment also further reduces any tendency for iridescence to occur. For instance, it is found that a layer of $TiO_2$ deposited after acid treatment on chemically tempered glass forms a very effective barrier against the water vapor present in the atmosphere.

The anchorage of the coating or coatings can be still further improved by treating the surface to be coated with a suitable conditioning agent. Particularly advantageous conditioning substances are solutions containing one or more ions of the following elements: tin, chromium, copper, aluminum, palladium. The surface placed in a state of compressive stress need not be completely covered; even a layer of conditioning agent having a thickness of less than 2 molecular layer is enough, and in this case the effect of the state of compressive stress of the surface and the reduction of the irregularities therein continues to ensure more satisfactory adherence between the layer to be deposited and the surface of the article.

The composition of the coating or coatings applied to the chemically tempered body may be such that an ion exchange can take place between such coating or coatings and the tempered surface. If such an ion exchange is brought about, the anchorage of the coating or coatings to the surface is still further improved.

When the coating layer or layers form a surface which has better mechanical properties than the surface of the body, the chemical tempering enhances the effect of the coating, and vice versa, in that the coating protects the tempered surface of the body from damage which would lower the tensile strength of the body, whereas the chemical tempering improves the protective properties of the coating. The two treatments therefore have a combined effect greater than the sum of the effects of the treatments taken individually. The tendency to "aging", i.e., progressive loss of mechanical properties, is reduced if the coating or coatings applied to the body have better mechanical properties than the surface of the body.

It is advantageous to apply one or more coating layers composed of at least one of the following compounds: $TiO_2$, $SiO_2$, $Al_2O_3$, $Cr_2O_3$, $Fe_2O_3$, $ZrO_2$, $Ta_2O_5$, $V_2O_5$, $ThO_2$, $Y_2O_3$, $CeO_2$, $ZnO$, $SiC$, $TiN$, $TaC$, $ZrC$, $B_2C$, $TiC$, $AlB$, $B_4C$, zircon, beryl, topaz, $ZnCrO_4$, $ZrB_2$. Layers formed from these compounds protect the surface against both iridescence and mechanical damage.

In order to realize the full benefits of the protection afforded by such coating, the coating layer or layers should be applied before the body has been subjected to any significant handling. Preferably, the coating layer or layers are applied immediately after, or at least within a few minutes after, the chemical tempering operation.

In a preferred embodiment of the invention, the operations of putting the surface to be coated into a state of compressive stress and depositing the coating layer or layers, possibly together with the intermediate cleaning and/or conditioning operations are preformed successively in a continuous manner so as to reduce to a minimum the risk of deterioration of the surface by intermediate handling, or as a result of uncontrolled dealkalinization of the body after the chemical tempering treatment due to the action of a humid atmosphere, for example.

Assuming that the coating operation is of a type which must be performed at an elevated temperature, it is also advantageous to apply the coating layer or layers immediately after the chemical tempering and before the article has cooled. This procedure has the advantage of a substantial saving in energy consumption and also a reduction in the stresses induced in the coating layer or layers, thus improving adherence.

The invention is particularly but by no means exclusively intended to be applied in the treatment and coating of glass in sheet form. When treating a sheet of glass, the chemical tempering and coating may be applied to the whole sheet or to only a part or parts thereof, e.g., to the edges of the sheet where the glass often tends to begin breaking on contact with a hard body.

The present invention also relates to any product made wholly or partly of glass or vitrocrystalline material which has been treated by a process as hereinbefore described.

The invention will be better understood from the following purely non-limitative examples, with reference to the drawings.

EXAMPLE I

A sheet of soda-lime glass was chemically tempered in a bath of potassium nitrate at 450°C for 20 hours, so that the breakage stress was increased by a factor of 12.

Figure 1:
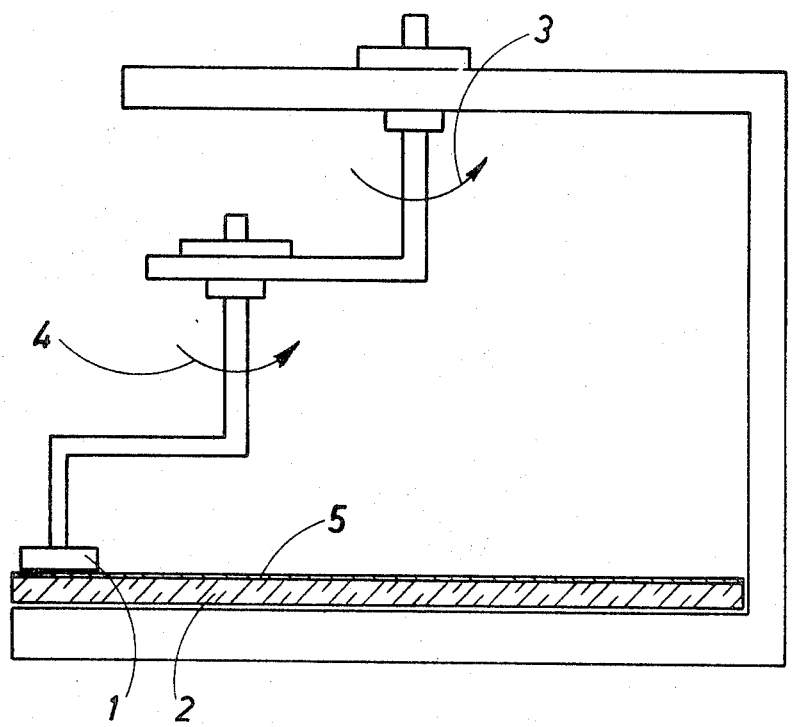
FIG. 1 is an elevational view of apparatus for measuring the friction resistance of coating layers deposited on a substrate.

After such treatment, the hardness of the glass on the Mohs scale was 5.6. A layer of $ZrO_2$ having a thickness of 1,500 A was deposited by immersing the sheet in a bath of zirconium acetate, followed by heating at 300°C in an air atmosphere to produce the coating of zirconia. This layer, having a Mohs hardness of 8.0, was subjected to a friction test by means of the apparatus shown in FIG. 1.

This apparatus is composed of a friction device 1 made of felt and impregnated with abrasive cerium oxide powder. The device 1 was applied to the glass at a pressure of 200 grams per $cm^2$. The device is subjected to two superimposed rotary movements, indicated by arrows 3 and 4, the rates of rotation of the two movements being different from one another and being selected so that device 1 passes more frequently over the center of the soda-lime glass sheet 2 covered by the zirconia layer 5, and less frequently over other zones, the frequency of passage over each zone being inversely proportional to its distance from the center. It was observed that an area 3 cm in diameter at the center of the glass was stripped after ten minutes of the test. In a comparative test on an identical piece of glass bearing an indentical coating but not chemically tempered before being coated, a central area 8 cm in diameter was stripped in 10 minutes.

EXAMPLE II

A sheet of vitrocrystalline material produced from the following composition by weight:
$SiO_2$ : 48%
$Al_2O_3$ : 32%
$Na_2O$ : 10%
$CaO$ : 2%
$TiO_2$ : 8%
was given a treatment in which $K^+$ ions were substituted for $Na^+$ ions. To this end, the sheet was immersed for 24 hours in a bath of $KNO_3$ at 500°C. The breakage stress of the chemically tempered sheet was 56 kg/mm² - i.e., three times higher than that of the untempered sheet.

Layers of gold of different thicknesses were deposited by evaporation in vacuo by a known technique on pieces of the tempered sheet, and on pieces of an untempered sheet of the same material. By experimentation it was established that a gold layer of only 80 A in thickness deposited on the chemically tempered vitrocrystalline material was suitably electrically conductive, whereas a similar electrical conductivity was not possessed by any gold layer deposited on the untempered material until the layer reached a thickness of 120 A.

The resistivity of a gold layer 150A thick deposited on each of two further pieces of the same vitrocrystalline material, one of which had been chemically tempered and one of which was untempered, was measured at different points on each sheet. The value of this resistance varied slightly and in a random manner from point to point on the sheet. A means relative quadratic deviation of 1 percent and 4 percent was measured for the tempered and the untempered sheets, respectively. Moreover, the gold layer adhered more satisfactorily to the tempered sheet than to the untempered sheet.

EXAMPLE III $Li^+$, $K^+$ or $Rb^+$ ions were exchanged for the $Na^+$ initially present in pieces of a soda-lime glass by treatments in baths of liquid salts containing the respective ions. Layers of a different type of material were deposited on these pieces of glass, and on identical pieces of glass which, however, had not been chemically tempered, by dipping the pieces of glass in a bath or organometallic material and subsequently oxidizing the coating in air or by evaporation in vacuum. Comparative friction tests were made by means of the apparatus of FIG. 1. After ten minutes at a friction pressure of 200 grams per cm² it was observed that the diameters of the stripped zones varied according to the combination of the type of ion exchange which had been been effected and the nature of the layer deposited. These diameters are given in centimeters under the respective headings in the following Table I in which the results of tests on untempered glass are also given:

TABLE I

| Layer | Alkali ions introduced by chemical tempering | | Untempered glass |
|---|---|---|---|
| | $Li^+$ | $K^+$ | $Rb^+$ |
| $ZrO_2$ | 4 | 3 | 5 | 8 |
| $SiO_2$ | 6 | 7 | 9 | 12 |
| $Al_2O_3$ | 4 | 3 | 4 | 7 |
| $ThO_2$ | 5 | 3 | 3 | 11 |
| BeO | 3 | 3 | 4 | 7 |
| MgO | 8 | 7 | 5 | 12 |
| Au | 16 | 15 | 10 | 26 |
| Ag | 16 | 14 | 12 | 28 |
| SiC | 1 | 2 | 3 | 6 |
| $ZrSiO_4$ | 2 | 3 | 4 | 10 |

In all cases an improvement was observed in relation to untempered glass.

From further tests which have been carried out, it has appeared that similarly good results are obtained when applying layers of $Cr_2O_3$, $Fe_2O_3$, $Ta_2O_5$, $V_2O_5$, $Y_2O_3$, $CeO_2$, ZnO, YiN, TaC, ZnC, $B_2C$, TiC, AlB, $B_4C$, topaz, $ZnCrO_4$ and $ZrB_2$.

EXAMPLE IV

A layer of $TiO_2$ was deposited on a sheet of borosilicate glass by deposition in the vapor phase. To this end, $TiCl_4$ vapors were played on the glass, which was kept at a temperature of 450°C in an air atmosphere. After treatment, the refractive index of the layer was measured by ellipsometry at twenty points over the surface of this glass. Another sheet of the same glass was first subjected to a $N2^+$ — $K^+$ exchange in a bath of $KNO_3$ at 400°C. After the exchange treatment, this second sheet of glass was treated for ten minutes in an aqueous solution containing 15 percent $H_2SO_4$ and 2 percent HF, whereafter a layer of $TiO_2$ was deposited in the same way as on the untempered glass sheet and the refractive index of this layer was also measured at twenty different points in the same way. It was observed that the mean quadratic deviation in the index of the layer on the untempered glass was twice as great as that of the index for the tempered glass. Moreover, the $TiO_2$ layer adhered more satisfactoryly to the tempered glass.

EXAMPLE V

After a piece of soda-lime glass had been treated by ion exchange in a bath of $KNO_3$, a layer of $ZrO_2$ was deposited on the glass by the wet method set forth in Example I. The layer gave the glass satisfactory resistance to iridescence, as well as a hardness of 8.0 on the Mohs scale. In comparative tests it was found that the adherence of the layer could be further improved by removing residual products of the ion exchange before depositing the zirconia layer. It was observed that both resistance to iridescence and adherence of the coating to the glass improved when washing was performed with an acid solution. When washing was performed with hydrofluoric acid, the coated glass had to remain 47 days in a humid atmosphere at 45°C for the resulting iridescence to be as great as that which took place in 18 days in the case of an identical piece of glass which had been tempered and coated in the same way but not washed before the coating layer was deposited. The friction test described in Example I removed the coating from a zone 2 cm in diameter from the glass which had been washed before being coated. The same test applied to the other pieces of glass removed the coating from a 3 cm diameter zone.

EXAMPLE VI

Soda-lime glass was drawn by the Pittsburgh method. The meniscus at the foot of the drawn glass ribbon in the drawing chamber, and the surface of the glass flowing towards the meniscus, were in contact with a layer of molten salt of the following composition:

$Li_2CO_3$ — 6 percent
LiCl — 4 percent
$NaNO_3$ — 90 percent

Due to this contact between the glass and the molten salt, sodium ions initially in the glass were replaced by lithium ions which conferred on the surface of the glass a coefficient of thermal expansion lower than that of the glass in the interior layers of the ribbon. In the surface of the drawn glass, 10 percent of the alkali metal ions were lithium ions.

At the level where the drawn glass in the drawing chamber was at a temperature of 500°C, the glass passed between two rollers which were continuously wetted with molten potassium nitrate. During the second treatment, 5 percent of the alkali ions in the surface of the glass were replaced by potassium ions. The drawn glass was thus tempered in the course of its fabrication. The compressive stresses in the exterior layers of the drawn glass after cooling amounted to 20 kg/mm².

A layer of $TiO_2$ was deposited from the vapor phase on the drawn tempered glass. By way of comparison, an identical layer of $TiO_2$ was similarly deposited on a sample of glass made from the same composition and in the same way, but without being tempered, the two liquid treating media being omitted. It was found that the adherence of the $TiO_2$ layer to the tempered glass was much better than the adherence of the $TiO_2$ layer to the untempered glass. In comparative friction tests using the apparatus of FIG. 1 and applying a pressure of 200 grams per cm² for ten minutes, the diameter of the stripped zone was 6 cm for the coated tempered glass and 12 cm in the case of the coated untempered glass.

EXAMPLE VII

Soda-lime glass was drawn and tempered in the drawing machine as in Example VI, but an electric field was established across the interface between the glass and the lithium-containing salt mixture, the field being generated between two electrodes, one located in the layer of molten salt and the other being located in the molten glass below the bottom of the drawn glass ribbon. The electric field strength was 50 volts per cm. The electric field accelerated the diffusion of lithium ions into the glass so that these ions penetrated deeper into the glass than in the absence of the electric field. Sodium ions initially present in the surface layer of the molten glass were displaced towards the cathode located in the bath of molten glass.

During the cooling of the drawn glass ribbon, its surface acquired low compressive stresses due to the difference between the coefficients of expansion of the glass in the surface layers and the glass in the interior layers of the ribbon. The weak compressive stresses were found, however, to be sufficient to markedly improve the adherence of a layer of $TiO_2$ to the glass. This improvement was made evident by applying a layer of $TiO_2$ to the tempered glass and an identical layer of $TiO_2$ to a sample of glass made in the same way but without being tempered, and subjecting the different samples to the friction test described in Example I.

The series of operations described in the above examples can be carried out discontinuously or continuously. The continuous process, which reduces the risks of deterioration between the various operations, can be performed in the installation illustrated in FIGS. 2a and 2b.

Figure 2A:
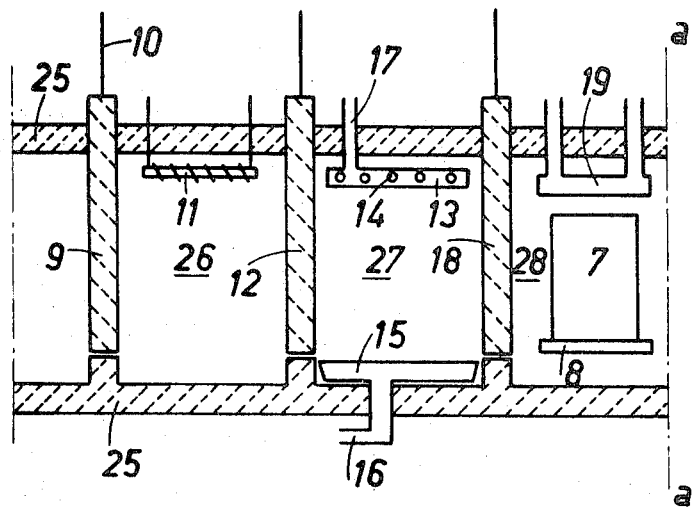
FIGS. 2a and 2b are a simplified elevational cross-sectional view, in two sections, divided along the line a—a, of a coating installation for carrying out the present invention.
Figure 2B:
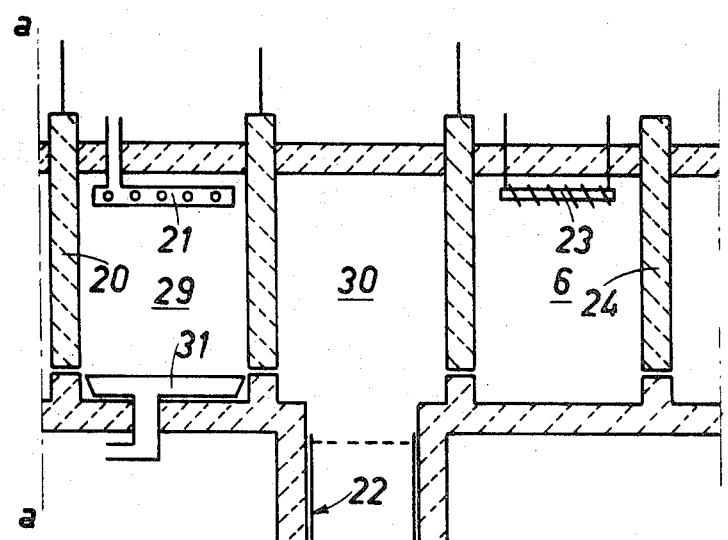

FIGS. 2a and 2b show the apparatus diagrammatically. Its wall 25 are made of a material which will stand up to the temperatures and products used during the treatment. An article, for instance, a sheet of glass 7, retained in the vertical position on a support 8 which is driven by advancing means (not shown), such as chains or carriages, enters a compartment 26 after a partition 9 has been raised by means of a suspension system 10. In the compartment 26, the glass is heated by electric resistances 11 until it reaches the temperature of the tempering treatment.

A partition 12 is then raised, and the glass is driven into a compartment 27, where it is sprinkled with a liquid salt of $KNO_3$ by means of tubes 13 provided with a large number of holes 14. A tank 15 collects the salt which flows down, and this salt is sent to a filter and a pump (not shown), via a system 16 of evacuation pipes, to be recycled through inlet 17. On termination of this treatment, the partition 18 is opened, and the sheet of glass moves forward into a compartment 28 in which the salt finishes flowing down and in which the sheet is cooled, possibly by means of boxes 19 through which a refrigerating fluid flows.

When the sheet reaches the required temperature, a partition 20 is raised to admit the glass into a compartment 29 in which a system of sprinkling pipes 21, similar to the system in the compartment 27, sprinkles the sheet with an acid solution which contains hydrofluoric acid and which is collected in a tank 31 to be recycled if necessary.

The sheet 7 then passes into compartment 30 in which is disposed a tank 22 containing zirconium acetate. The sheet is immersed in this liquid and then lifted out of it, whereafter the sheet moves into a compartment 6 in which the layer deposited is oxidized by a treatment in air at a suitable temperature produced by heating elements 23.

The sheet, which has undergone all the required treatments, leaves the treatment line after a door 24 has been opened.

Sheets of soda-lime glass as in Example V were treated in the manner hereinbefore described, some continuously and some discontinuously. It was observed that adherence was even better in the case of the sheets subjected to the continuous treatment. When the friction test was performed on those sheets, the stripped zone was only 1 cm in diameter, whereas in similar tests on sheets subjected to a discontinuous treatment, the stripped zone was 2 cm in diameter.

Of course, the invention is not limited to the exemplary embodiments described and illustrated, and modifications could be made thereto without exceeding the scope of the invention.

The invention also includes any body of vitreous or vitrocrystalline material which has compressive surface stresses in at least a part of such body where it bears a surface coating, and wherein the concentration of certain ions in a surface region of said part is higher than the concentration of such ions in an interior region thereof. The presence of those features is indicative that a treatment process according to the invention as hereinbefore defined has been applied. In particular, the invention includes any such body which contains sodium ions and wherein at least in a part of such body where it bears a surface coating, the body has a higher concentration of potassium ions in a surface region than in an interior region thereof.

Figure 4:
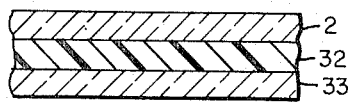
FIG. 4 is a view similar to that of FIG. 3 of another article produced according to the invention.

A body according to the invention as above defined, e.g. a body in the form of a sheet of coated glass, can be bonded to at least one other sheet of material, e.g., another sheet of coated glass according to the invention, to form a laminate. The invention includes any such laminate. Such bonding may be achieved by means of an intermediate layer of plastic. One such arrangement is shown in FIG. 4 where a body 2 according to the invention and a second sheet 33 are bonded to a plastic layer 32.

Figure 5:
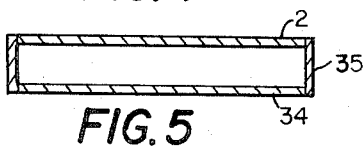
FIG. 5 is a cross-sectional view of an article employing a body according to the invention.

The invention also includes a double window comprising sheets of glass assembled in spaced relationship, at least one of such sheets being a coated body as above defined. The sheets may be secured together in their spaced relationship to form an integral double glazing unit. In a double window according to the invention a coating on the inside of a given sheet is afforded protection by a facing sheet. This is shown in FIG. 5 where a glass sheet 2 according to the invention is connected to a second glass sheet 34 by a frame 35.

It will be understood that the above description of the present invention is susceptible to various modifications, changes and adaptations.

I claim:

1. A method for treating a body of glass or vitrocrystalline material, comprising the steps of:
   a. chemically tempering at least a portion of the body so as to create compressive stresses in the surface of such portion; and
   b. applying a coating layer to at least part of such surface while maintaining the surface and coating material at an elevated temperature whose value is below that at which any substantial relaxation of the compressive stresses created by said chemical tempering step can occur and by an operation selected from the group consisting of: evaporation in vacuo; cathode sputtering; and disposing an oxidizable compound on the surface and thermally decomposing the compound to form an oxide which constitutes the coating layer;
   c. wherein the resulting layer is of a material selected from the group consisting of oxides, carbides, nitrides, borides, zircon, beryl, topaz, chromates and noble metals.

2. A method as defined in claim 1 wherein said step of chemically tempering is carried out by causing at least one substance to enter such portion from a contacting medium and controlling the temperature of such portion during and after such entry.

3. A method as defined in claim 2 wherein said step of chemically tempering is carried out by effecting an ion exchange between the body and the contacting medium.

4. A method as defined in claim 3 wherein the ion exchange involves the introduction into said body of ions of a type which reduce the coefficient of expansion of the surface layer of the body.

5. A method as defined in claim 3 wherein the ion exchange involves the replacement of ions initially present in the body by larger ions.

6. A method as defined in claim 3 comprising the additional step of, after said step of chemically tempering and before said step of applying, removing at least part of the residual products of the reaction occurring between said body and the contacting medium as a result of the ion exchange.

7. A method as defined in claim 6 wherein said step of removing is carried out by the application of an acid solution.

8. A method as defined in claim 2 wherein said step of chemically tempering involves cooling said body after the entry of such substance, and said step of applying is caried out before said cooling step has been completed.

9. A method as defined in claim 1 wherein said body is itself constituted by a coating disposed on a substrate made of a material which is different from that of said body.

10. A method as defined in claim 1 wherein said body is constituted by a manufactured article.

11. A method as defined in claim 1 comprising the additional step of, before said step of applying, conditioning said body with a substance which ensures an improved adherence of the coating layer to the body surface.

12. A method as defined in claim 1 wherein the coating layer is of a material that creates a surface having better mechanical properties than the surface of the body itself.

13. A method as defined in claim 12 wherein the coating layer is composed of at least one material selected from the group consisting of $TiO_2$, $SiO_2$, $Al_2O_3$, $Cr_2O_3$, $Fe_2O_3$, $ZrO_2$, $Ta_2O_5$, $V_2O_5$, $ThO_2$, $Y_2O_3$, $CeO_2$, ZnO, SiC, TiN, TaC, ZrC, $B_2C$, TiC, AlB, $B_4C$, zircon, beryl, topaz, $ZnCrO_4$ and $ZrB_2$.

14. A method as defined in claim 1 wherein said steps are performed one immediately after the other.

15. A method as defined in claim 1 wherein said body is constituted by a sheet of glass.

16. A method as defined in claim 7 wherein the solution is of hydrofluoric acid.

17. A method as defined in claim 1 wherein the resulting coating layer is of a material which creates a surface having a better abrasion resistance than the surface of the body itself.

18. A method as defined in claim 1 wherein the resulting coating layer is electrically conductive.

19. A method for treating a body of glass or vitrocrystalline material, comprising the steps of:
a. chemically tempering at least a portion of the body so as to create compressive stresses in the surface of such portion; and
b. applying a coating layer to at least part of such surface while maintaining the surface and coating material at an elevated temperature whose value is below that at which any substantial relaxation of the compressive stresses created by said chemical tempering step can occur, the layer being applied by disposing an oxidizable compound on the surface and thermally decomposing the compound to form an oxide which constitutes the coating layer.

20. A method as defined in claim 19 wherein the resulting coating layer is of a material which creates a surface having a better abrasion resistance than the surface of the body itself.

21. A method as defined in claim 19 wherein the resulting coating layer has an index of refraction different from that of the body.

22. A method for treating a body of glass or vitrocrystalline material, comprising the steps of:
a. chemically tempering at least a portion of the body so as to create compressive stresses in the surface of such portion; and
b. applying a coating layer to at least part of such surface while maintaining the suface and coating material at an elevated temperature whose value is below that at which any substantial relaxation of the compressive stresses created by said chemical tempering step can occur;
c. wherein the resulting layer is of a material selected from the group consisting of $TiO_2$, $SiO_2$, $Al_2O_3$, $Cr_2O_3$, $Fe_2O_3$, $ZrO_2$, $Ta_2O_5$, $V_2O_5$, $ThO_2$, $Y_2O_3$, $CeO_2$, ZnO, SiC, TiN, TaC, ZrC, $B_2C$, TiC, AlB, $B_4C$, zircon, beryl, topaz, $ZnCrO_4$, $ZrB_2$, Au, Ag, BeO and MgO.

23. A method for treating a body of glass or vitrocrystalline material, comprising the steps of:
a. chemically tempering at least a portion of the body so as to create compressive stresses in the surface of such portion;
b. applying a coating layer to at least part of such surface; and
c. before said step of applying, conditioning said body with a substance which insures an improved adherence of the coating layer to the body surface, the substance being constituted by a solution containing ions of at least one element selected from the group consisting of tin, aluminum, copper, palladium and chromium.

24. A method as defined in claim 1 wherein the resulting coating layer has an index of refraction different from that of the body.

25. A method as defined in claim 19 wherein the resulting coating layer is electrically conductive.

26. A method as defined in claim 22 wherein said step of applying is carried out by evaporation in vacuo.

27. A method as defined in claim 1 wherein said step of applying is carried out by cathode sputtering and the resulting layer is of a material selected from the group consisting of $TiO_2$, $SiO_2$, $Al_2O_3$, $Cr_2O_3$, $Fe_2O_3$, $Ta_2O_5$, $ThO_2$, $CeO_2$, ZnO, SiC, TiN, TaC, TiC, AlB, beryl, topaz, $ZnCrO_4$, Au, Ag, Beo and MgO.

28. A method as defined in claim 19 wherein the resulting layer is of a material selected from the group consisting of $TiO_2$, $SiO_2$, $Al_2O_3$, $Cr_2O_3$, $Fe_2O_3$, $ZrO_2$, $V_2O_5$, $ThO_2$, $Y_2O_3$, $CeO_2$, ZnO, BeO and MgO.

* * * * *